Dec. 17, 1968 C. F. HIGH 3,416,503
ENGINE FUME DISCHARGE REDUCTION SYSTEMS
Filed Oct. 27, 1967 3 Sheets-Sheet 1
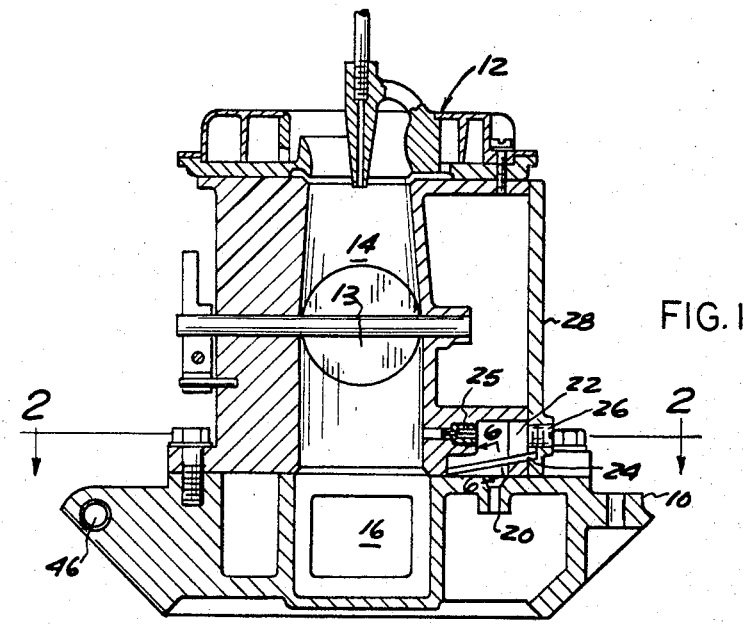
FIG. 1
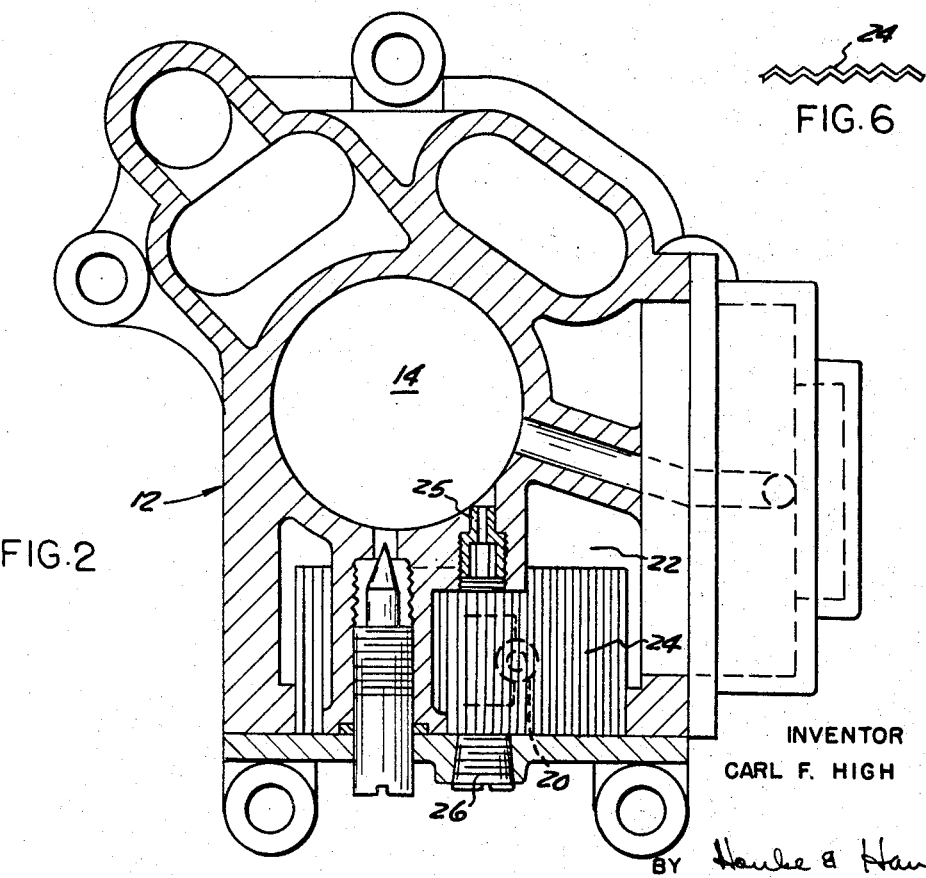
FIG. 2
FIG. 6
INVENTOR
CARL F. HIGH
BY Hauke & Hauke
ATTORNEYS

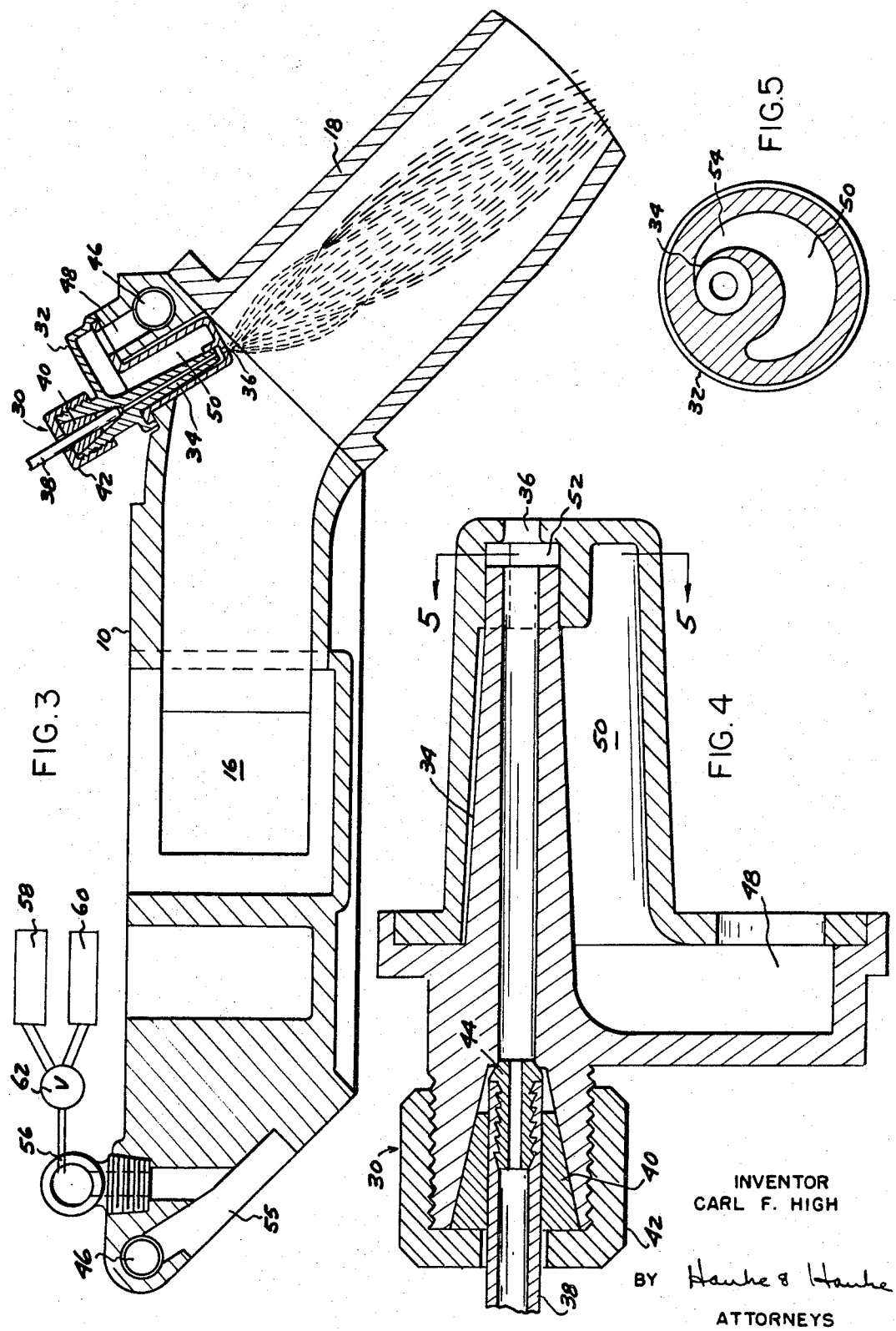

Dec. 17, 1968  C. F. HIGH  3,416,503
ENGINE FUME DISCHARGE REDUCTION SYSTEMS
Filed Oct. 27, 1967  3 Sheets-Sheet 3
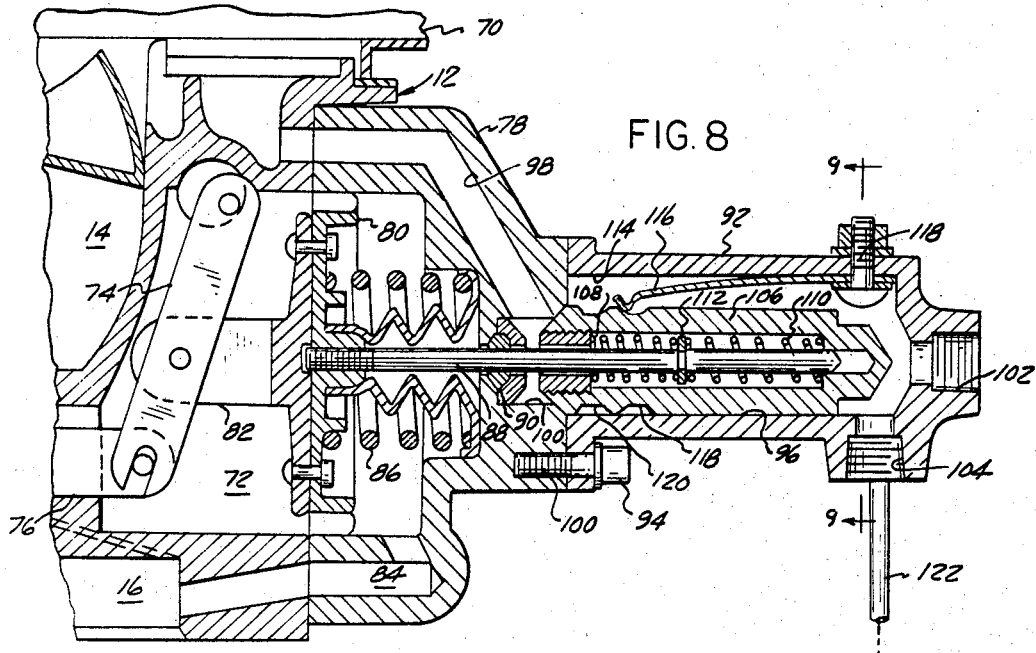
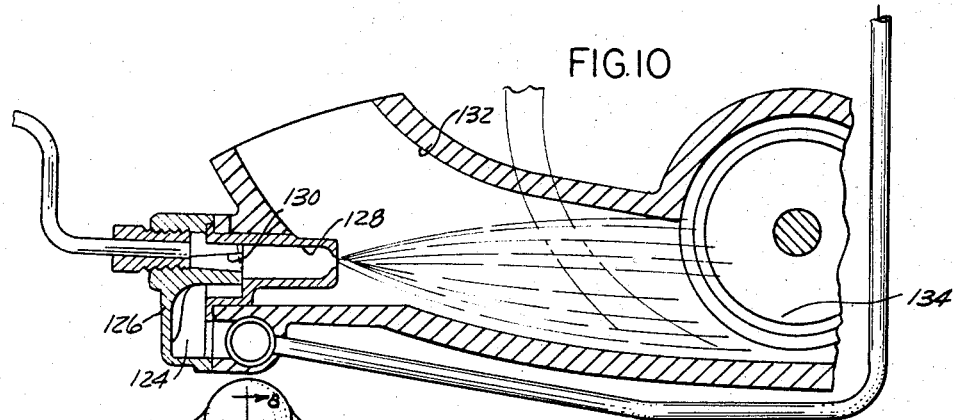
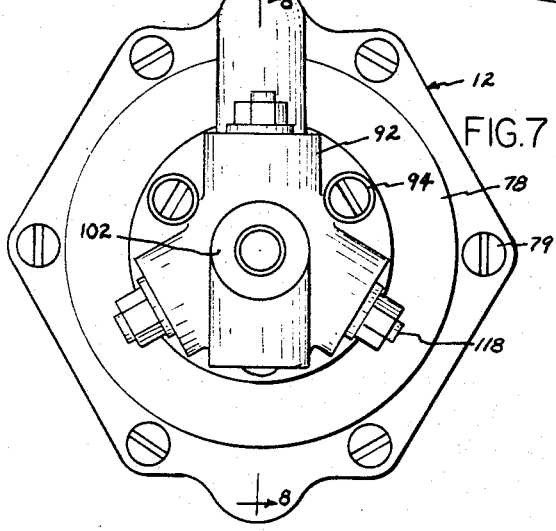
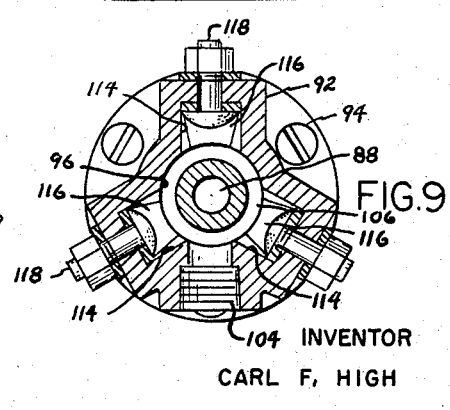
INVENTOR
CARL F. HIGH
BY Hauke, Krass, + Hefford
ATTORNEYS

United States Patent Office

3,416,503
Patented Dec. 17, 1968

3,416,503
ENGINE FUME DISCHARGE REDUCTION
SYSTEMS
Carl F. High, 17581 Appoline, Detroit, Mich. 48235
Continuation-in-part of application Ser. No. 519,132,
Jan. 6, 1966. This application Oct. 27, 1967, Ser.
No. 700,336
15 Claims. (Cl. 123—119)

ABSTRACT OF THE DISCLOSURE

An internal combustion engine port carburetion system adapted for fume discharge reduction in which crankcase fumes are discharged into the air intake manifold downstream of the throttle valve and in which fuel jet nozzles at each cylinder intake port are selectively vented to minimize the effect of manifold suction on the fuel distribution lines, with means for selectively directing air and other gas, either exhaust gas or externally supplied gas under pressure, to the fuel jet nozzle vents utilizing a valve selectively positioned responsively to engine manifold pressures.

Cross reference to related applications

This application is a continuation-in-part of patent application Ser. No. 519,132 filed Jan. 6, 1966, now abandoned, and constitutes an improvement over my copending patent application Ser. No. 487,221 filed Sept. 14, 1965 and my Patent No. 3,232,284, issued Feb. 1, 1966.

Background of the invention

*Field of the invention.*—The present invention relates to internal combustion engnes having port carburetion, and in particular to a fume discharge reduction system for such engines combined with fuel jet nozzle venting of improved operational characteristics.

*Description of the prior art.*—The reduction in discharge residue from internal combustion engines, particularly in automobiles and large commercial vehicles such as trucks and buses, has received substantial attention in recent years. The reason for this attention has been part of a total effort aimed at reducing smog or polluted air concentrations in the larger cities.

Efforts toward reducing the discharge residue from internal combustion engines have been aimed at two major areas. The first area has been related to the crankcase vapors and blowby gases which have previously been discharged directly to the atmosphere. In recent engine designs, the crankcase fumes have been delivered to an induction system to be burned in the cylinders. In my copending patent application Ser. No. 487,221, filed Sept. 14, 1965, an improved system for eliminating the discharge of crankcase fumes discharged to the atmosphere is disclosed in which ram air is provided from the air induction system to purge the crankcase of fumes, means including an adhesion surface are provided for removing the gums and solid particles from the fumes and means are provided for delivering the fumes to the air manifold for burning in the cylinders.

The second area at which efforts have been directed to reduce discharge residue has been the improvement of engine combustion characteristics. The reason is that by optimizing the combustion process, fewer unburned or partially burned components are available for discharge to the atmosphere.

Summary of the invention

The present invention features a system in which the means for elimination of crankcase vapors and the reduction of exhaust discharge residue are improved. The preferred embodiment comprises a forced crankcase ventilation system substantially as disclosed in the aforementioned copending patent application, in which ram air is supplied from the air induction system to purge the crankcase of vapors. The vapors are directed to a control box in which means are disposed for removing the gums and other residue. The vapors are then discharged into the air induction system where they are delivered into the intake manifold by the inducted air. In the intake manifold, the inducted air is delivered through an atomized fuel spray to form a homogeneous fuel-air mixture which is then delivered to the cylinders for improved combustion.

The atomized fuel spray is provided by an improved fuel nozzle preferably comprising a housing fixed exteriorly to the intake manifold, and a fuel discharge jet disposed in the housing and spaced from a discharge port formed in the manifold. The jet is adapted to discharge a spray of fuel into the inducted air flowing through the manifold to the cylinders. The nozzle housing provides a heating chamber surrounding the discharge jet. Preferably hot exhaust gases are delivered to the heating chamber where the fuel is heated to assist in vaporization. The exhaust gases are then delivered to the space intermediate the discharge jet and the discharge port where they are mixed by centrifugal action with the discharged fuel to assist in atomization. The fuel-gas mixture then forms a mist that is injected through the port to mix with the inducted air. Preferably the intake manifold has individual passages for delivering air to each of the cylinders, and a fuel nozzle is provided for each of the passages.

In the aforementioned copending patent application, crankcase fumes were delivered to the fuel nozzle to assist in satisfying the vacuum created in the intake manifold during idling and low speed operation and which would normally aspirate the fuel from the fuel line. The aspirating jet by drawing on the crankcase fumes would tend to vent the crankcase during idling speeds. In the present invention, the exhaust gases function to aspirate the fuel jets and provide a special advantage over previous aspiratory methods in that the pressure of the exhaust gases is proportional to the level of operation of the engine, the rate of fuel discharge from the jet, and the manifold pressure. In order to vent the crankcase fumes during engine idle, the present invention provides means for delivering the fumes to a separate chamber in the control box where the solids are removed. The fumes are then delivered through an orifice below the air throttle valve to the air induction system. An adjustable needle valve also provided below the throttle valve permits fresh air from the control chamber to be inducted into the manifold for fuel-air proportion during engine idle.

The fuel jet nozzles in the present invention are selectively alternatively vented with air and other gases, either exhaust gases or externally supplied gases under pressure. A novel two position, resiliently actuated and held valve is incorporated for operation by the manifold pressure responsive element which operates the fuel metering system of the engine.

It is therefore an overall objective of the present invention to minimize the discharge residue of internal combustion engines by eliminating the discharge of crankcase fumes to the atmosphere, and by providing an improved fuel atomization system to optimize the combustion process and thereby reduce unburned exhaust residue.

The preferred embodiment of the present invention comprises a relatively simple structure that can be readily incorporated as an improvement in current engine designs or can be incorporated in existing engines, particularly commercial trucks and busses by a simple and economical conversion. In order to eliminate extensive tubing, the preferred intake manifold is provided with integral passages for delivering the exhaust gases to the fuel nozzles.

Instead of exhaust gases, an exteriorly supplied gas or combination of gases under pressure can also be utilized to atomize the discharging fuel and to aspirate the discharge jet. For large commercial vehicles used in both city and cross-country service, a pressurized tank of oxygen or propane can be provided with a change-over valve to introduce the gas during city driving and for engine starting and a less expensive gas or air during open country service.

It is therefore an object of the present invention to reduce the fume discharge residue of internal combustion engines by optimizing the combustion characteristics of such engines through an improved fuel atomization system which can be used in combination with a positive crankcase ventilation system.

It is another object to improve the fuel vaporization characteristics of aspirated fuel jets by using the engine exhaust gases to heat the fuel prior to discharge thereby assisting in vaporization, and by introducing the exhaust gases tangentially into the fuel discharge path to thereby assist in atomization in addition to sealing the fuel supply duct from the vacuum of the intake manifold.

It is still a further object of the present invention to reduce the operating costs of engines having aspirated fuel jets by providing means for sealing such jets with an exteriorly supplied source of gas during urban driving and a source of a less expensive gas during open country driving.

It is another object of the present invention to aid in starting engines having aspirated fuel jets by providing means for sealing such jets with an exteriorly supplied source of combustible gas during engine starting.

It is another object of the present invention to reduce the costs of incorporating aspirated fuel nozzles into present engine designs and existing engines by providing an intake manifold having fuel nozzles formed of a relatively few economically produced components.

Other objects and advantages of the present invention will be more readily apparent from the following detailed description and the accompanying drawings in which:

FIG. 1 is a fragmentary elevational view showing the crankcase ventilation unit and the air intake manifold of the preferred engine;

FIG. 2 is an enlarged plan view showing the crankcase ventilation unit in section as seen from line 2—2 of FIG. 1;

FIG. 3 is a sectional view of the intake manifold and the preferred fuel nozzle;

FIG. 4 is an enlarged cross-sectional view of the preferred fuel nozzle of the present invention;

FIG. 5 is a sectional view of the fuel nozzle as seen from line 5—5 of FIG. 4;

FIG. 6 is a view of a preferred adhesion plate;

FIG. 7 is an end view of the control housing mounted on the side of the air intake assembly of FIG. 1;

FIG. 8 is a longitudinal cross-sectional view taken substantially on the line 8—8 of FIG. 7;

FIG. 9 is a cross-sectional view taken substantially on the line 9—9 of FIG. 8; and FIG. 10 is a cross-sectional view of a modified fuel jet nozzle.

Now referring to the drawings, FIGS. 1, 2 and 3 show the preferred intake manifold 10 of a multicylinder engine provided with air intake-crankcase breather assembly 12 having an air throttle valve 13 and a central passage 14 which is connected to a longitudinal intake manifold passage 16 for distributing air to several intake runners 18. Each of the intake runners 18 leads to one of the engine cylinders (not shown). An air cleaner assembly (not shown) is mounted on top of the assembly 12, and is preferably arranged to receive ram air for delivery into the assembly 12.

The assembly 12 is substantially the same both functionally and structurally as disclosed in my copending patent application Ser. No. 487,221, filed Sept. 14, 1965, in which ram air is scooped at the entrance of the air induction system of the engine to pressurize and purge the crankcase of fumes. However during low speed operation and engine idling, an aspirator fuel spray assembly was utilized to vent the crankcase fumes. In the present invention, during engine idle the crankcase fumes are vented through an orifice 20 into a filter chamber 22 provided in the assembly 12. Preferably a corrugatedly shaped adhesion plate 24 is disposed in the chamber 22 in the path of the fumes. As can be seen in FIG. 6, the adhesion plate 24 has a large surface area which acts to cause oil which may have been expelled from the crankcase with the fumes to either adhere to the plate 24 or to drip downwardly and thereby find its way back to the crankcase through the orifice 20. The filter chamber 22 has an outlet orifice element 25 to allow the fumes to vent into the passage 14 downstream of the throttle valve 13. During engine idling, a vacuum is created in the intake manifold 10 thereby drawing the crankcase fumes from the crankcase into the filter chamber 22 and into the central passage 14 where they are delivered with the intake air to the engine cylinders for burning. A threaded opening having a pipe plug 26 is formed in the assembly 12 and adapted to permit inspection or removal of the orifice element 25 for cleaning. The orifice element 25 is preferably threaded into place and is removable by a conventional hex wrench. The assembly 12 has a cover plate 28 which may be removed for inspection and cleaning of the adhesion plate 24.

As can best be seen in FIGS. 3 and 4, a fuel spray nozzle assembly 30 is mounted on top of the intake manifold 10 with one assembly 30 provided to inject fuel into each of the port runners 18. The nozzle assembly comprises a two part housing 32 which carries a fuel discharge jet 34 discharging through a discharge port 36. Fuel is supplied from a fuel control unit (not shown) through a conduit 38 which is connected to the nozzle housing 32 by means of a collet 40 and a nut 42. An insert 44 is provided in the end of the conduit 38 and supports the conduit 38 from collapsing under the tightening effect of the nut 32. The insert 44 provides a reduced area in the conduit 38 to reduce aspiration created in the discharge jet from communicating with fuel upstream of the connection.

The intake manifold 10 has a preferably longitudinal integral passage 46 formed adjacent each bank of nozzle assemblies 30. A preferred engine having eight cylinders arranged in two banks would have two passages 46 as can be seen in FIG. 3 (one for each bank). The ends of the passages are preferably capped with plugs (not shown). A passage 48 in the nozzle assembly 30 communicates the passage 46 with a heating chamber 50 formed in each nozzle housing 32 and surrounding the fuel discharge jet 34. The heating chamber 50 communicates with a mixing chamber 52 disposed between the tip of the discharge jet 34 and the discharge port 36 by means of a tangential duct 54 as shown in FIG. 5. In the preferred embodiment, an inlet 55 bleeds exhaust gases into the internal passage 46 which then distributes the gas to each of the nozzle assemblies 30. The exhaust gas flows into the heating chamber 50 and transfers part of its heat through the jet 34 to the fuel flowing therethrough. As can best be seen in FIGS. 4 and 5, the exhaust gas then flows through the tangential duct 54 to mix with the discharging fuel in the mixing chamber 52. It is apparent that the exhaust gas heats the fuel to assist in vaporization and then imparts a whirling motion to the discharging mist to assist in atomization. The fuel and the exhaust gas then discharge through the port 36 into the port runner 18 where the vaporized fuel and air form a homogeneous mixture for delivery to the cylinder for combustion.

It is obvious that the novel means of utilizing hot exhaust gases to vaporize and atomize the fuel, not only recovers some of the heat normally lost in the discharged exhaust gases, but what is more important, by a proper choice of discharge jet size, shape, or area, and by varying the number and sizes of the tangential ducts, the optimum vaporization of fuel can be obtained on any size of engine. Because the exhaust heat is transferred only to the fuel which is then mixed with the air in close proximity to the cylinders, the fuel-air mixture is not heated significantly to affect the volumetric efficiency of the engine.

In addition to the aforementioned advantages gained by using the exhaust gases to vaporize and atomize the fuel, the gas also functions to seal the fuel jet 34 during idling or low speed operation from the vacuum that normally is created in the intake manifold 10. The exhaust gas flowing through the discharge port 36 satisfies the intake manifold vacuum and thus keeps it from exerting more than a mild suction on the fuel jet 34. By cooperating with the insert 44, the aspirating gas enables the fuel conduit 38 to be kept solidly filled with fuel. A further special advantage gained by utilizing exhaust gases in sealing the fuel nozzles is that their pressure is proportional to the fuel consumption so that the highest pressure is available to seal the nozzles and assist in atomizing the fuel at the maximum consumption of fuel.

In some applications, for instance in converting large commercial vehicles such as trucks and busses to an aspirator type of fuel jet, an alternate form of gas can be used instead of exhaust gas to atomize the fuel and to seal the fuel nozzles. For example oxygen, nitrogen or propane from a pressurized source (not shown) can be introduced as indicated in FIG. 3 through an inlet 56 provided in the inlet manifold 10 to deliver the gas to the passages 46 for distribution to the nozzle assemblies 30. A properly chosen gas will seal the aspirating fuel jets and also by combining with the fuel-air mixture improve the combustion characteristics of the engine to thereby reduce the unburned components discharged to the atmosphere.

In some applications, a dual gas or a gas and air means could be used on commercial vehicles that travel partly in the city where smog conditions exist and partly across country. In this embodiment of the present invention, a gas such as propane would be delivered from a pressurized source 58 to the inlet 56 during city driving when a minimum of unburned exhaust components are required. A second less expensive gas or air from a pressurized source 60 could be used during cross-country driving by adding a changeover valve 62 to switch from one gas to the other. It is further apparent that a gas from an exterior source could be used either alternately or in combination with the exhaust gases to improve combustion and fuel performance or to aid in engine starting.

FIGURES 7 through 10 illustrate a valving system for selectively alternatively directing air and gas to a modified form of vented fuel jet nozzle. The assembly 12, shown in FIGURE 8 includes on its upper end an air cleaner 70 of any preferred type (shown only partially) and a control chamber 72 in which is located a fuel metering actuating arm 74 adapted to linearly actuate a fuel metering element 76 as described in my Patent No. 3,232,284. Operation of the element 76 to the left as seen in FIGURE 8 will increase fuel flow to the engine intake port fuel jet nozzles, while actuation of the element 76 to the right will decrease fuel flow.

A control housing 78 is mounted by any means such as screws 79 on the side of the housing assembly 12 and carries a diaphragm element 80 which is connected through a fork 82 to the arm 74 as shown. Manifold pressure from the manifold 16 is introduced behind the diaphragm element 80 through passages 84 in the housings 12 and 78, such that an increase in manifold pressure will actuate the diaphragm element 80, and hence the element 76, to the left (high fuel flow), while a decrease in manifold pressure such as occurs at idling will actuate the diaphragm element 80, and hence the element 76, to the right (low fuel flow) against the force of a spring 86 disposed in the housing 78. An actuating rod 88 secured to the diaphragm element 80 extends outwardly of the housing 78 through a graphite seal 90. A valve housing 92 is secured by any means such as screws 94 to the housing 78 and has a valve chamber 96 therein as shown.

The housing 78 has an air passage 98 extending from the downstream side of the air cleaner 70 to a recess as seen. The valve housing 92 has a gas inlet 102 at the end opposite to the recess 100, and an outlet port 104 at the side. A valve element 106 is slidably carried within the chamber 96 and on the actuating rod 88. A pair of springs 108 and 110 are carried within the valve 106 and are compressed lightly between a centrally located snap ring 112 on the rod 88 and the ends of the valve element 106. Three longitudinal recesses 114 are provided in the housing 92 for the passage of air in the chamber 96, and provide space for leaf springs 116 which are secured by screws 118 or the like and have their free ends engaging the valve element 106 in the vicinity of a pair of spaced annular grooves 118 and 120.

It will be seen that with the diaphragm element 80 in its leftward position as shown in FIGURE 8, the spring 108 is compressed to urge the valve element 106 to the left to close the recess 100 and to open the port 102. The port 102 is connected to either engine exhaust gas or to the aforementioned external source of gas under pressure, which is thus permitted to flow out of the port 104. As manifold pressure is decreased, as in engine idling operation, the diaphragm 80 moves to the right actuating the rod 88 to the right, exerting a compressive force on the spring 110. As soon as this force overcomes the retention force of leaf spring 116 which was engaged in the groove 118, the valve element 106 will snap over to the right, thereby closing the port 102 and opening the recess 100 to admit air through the passages 114 to be discharged or drawn out of the port 104. The port 104 is connected by any means such as tubing 122 (or by internally drilled passages as previously described) to the vent chamber 124 of the fuel jet nozzle 126. The air or gas is admitted to a discharge chamber 128 through which fuel is ejected from the fuel passage 130 in the jet nozzle. The fuel is directed by the fuel jet nozzle 126 into the port runner 132 of the intake manifold and toward the cylinder intake valve 134 for port carburetion Since the invention disclosed in the present application Ser. No. 519,132, now abandoned, calculations have indicated that when the fuel jets are sealed from manifold suction as above described, it is necessary that oxygen from the atmosphere is needed for engine idling. The same quantity of oxygen, supplied externally of the jets, does not overcome the handicap of dilution of exhaust gas through the jets. In the upper or power ranges of the engine operation, hot exhaust gases for the sealing jets have the advantage of better atomization and vaporization of the fuel supplied to the jets. With only a slight decrease of power, a minimum use of exhaust gases in the mixture will materially reduce formation of nitric oxide by the engine, nitric oxide being the reactive material in the photocatalysis of nitrogen dioxide, and which is acidic and toxic. With atmospheric oxygen being necessary for engine idling, and the heat and pressure of exhaust gases being highly desirable for upper ranges of engine operation, the above two-way valve appears to be a necessity. The valve must be dependable and easy to operate and must be adapted to switch quickly from one gas to the other at a predetermined point. Functioning of the valve must be integral with or dependent on the fuel system operation. Thus the valve as shown in FIGURE 8 is connected to and operated by the diaphragm assembly which shifts the position of the metering and distributing valve in the fuel system control unit.

It can therefore be seen that I have described an improved aspirated fuel jet system that by utilizing exhaust gases to assist in vaporizing, and atomizing the fuel and also to seal the nozzle assembly, will provide a homogeneous air-fuel mixture for optimum combustion characteristics and fuel consumption. The improved aspirated fuel jet system is preferably used in combination with a positive crankcase ventilation system to produce an engine that discharges a minimum of unburned components to the atmosphere. In addition, the system as described can be incorporated in existing engines by an economical conversion because of the simplified design.

Although I have described several embodiments of the present invention, it will be apparent to one skilled in the art to which the invention pertains that various changes and modifications can be made therein without departing from the spirit of the invention or the scope of the appended claims.

I claim:

1. An engine fume discharge residue reduction system for an internal combustion engine having a crankcase, engine cylinders having intake ports and valves therefor, an air induction means including an air intake manifold connected with said cylinders, and fuel metering and distribution means, said system comprising:
    (a) fuel nozzle means for each cylinder for discharging metered fuel into said manifold and directed toward said cylinder intake ports, said nozzle means including a fuel discharge jet and a discharge port spaced from said jet;
    (b) means delivering a gas under pressure from a source exterior of said air induction means to the space intermediate said jet and said port to prevent manifold suction from exhausting fuel from said fuel distributing means during idle operation;
    (c) said nozzle means including a housing having a heating chamber enclosing said discharge jet; and
    (d) means delivering a hot gas under pressure other than crankcase blowby gases to said chamber in heat exchange relation to said fuel.

2. The invention as defined in claim 1, wherein said hot gas comprises the exhaust gases of said engine.

3. The invention as defined in claim 2, wherein said air induction system includes a throttle valve, and including means for venting fumes from said crankcase to a point intermediate said throttle valve and said fuel discharge ports into said induction system.

4. The invention as defined in claim 3, wherein said intake manifold has an integral passage for delivering said exhaust gas to said nozzle means.

5. The invention as defined in claim 4, wherein said nozzle means includes means for delivering said gas from said heating chamber tangentially to the cross-section of discharging fuel in the space intermediate said discharge jet and said port.

6. The invention as defined in claim 1, including:
    (a) a means for delivering a second gas under pressure from a source exterior of said air induction means to the space intermediate said jet and said port, and
    (b) means adapted to permit only one of said gases to pass to said nozzle means.

7. The invention as defined in claim 6, wherein valve means permit only one of said gases to pass to said nozzle means.

8. The invention as defined in claim 1, including:
    (a) a fuel supply duct connected to said discharge jet, and
    (b) an orifice element disposed in said fuel supply duct upstream of said discharge jet and effective to assist said gas in sealing fuel in said supply duct from the aspiratory effect of vacuum in said intake manifold.

9. In an internal combustion engine port carburetion system in which said engine includes a crankcase, engine cylinders having intake and exhaust ports and valves therefor, air induction means including an air cleaner, an air intake manifold connected with said intake ports, and fuel metering and distribution means, the improvement comprising:
    (a) fuel jet nozzles for discharging fuel into said intake ports and having vent means to seal the fuel distribution means from the effect of manifold suction during engine idling operation, and
    (b) means selectively alternatively directing air and other gas to said vent means.

10. The system as defined in claim 9 and in which said last mentioned means is actuated responsively to predetermined changes of manifold pressure.

11. The system as defined in claim 9 and in which said last mentioned means selectively alternatively directs air and engine exhaust gas to said vent means.

12. The system as defined in claims 9 and in which said last mentioned means selectively alternatively directs air and gas under pressure from an engine-independent gas source to said vent means.

13. The system as defined in claim 9 and including:
    (a) a manifold pressure actuated element operatively connected with the fuel metering means, and
    (b) valve means connected with said manifold pressure actuated element and operable to alternatively direct air and other gas to said vent means responsive to movement of said pressure actuated element.

14. The system as defined in claim 9 and in which said last mentioned means includes means conducting said air from downstream of said air cleaner.

15. The system as defined in claim 13 and including:
    (a) a housing having a valve chamber provided with an outlet, an air inlet, and a gas inlet,
    (b) a valve element selectively positioned between a first position closing the air inlet and opening the gas inlet and a second position opening the air inlet and closing the gas inlet, and
    (c) an actuating element operably connecting said manifold pressure actuated element with said valve element to move same from one to the other of said positions.

References Cited

UNITED STATES PATENTS

| | | | |
|---|---|---|---|
| 1,166,560 | 1/1916 | Tice | 123—119 |
| 1,222,589 | 4/1917 | Arnold | 123—119 |
| 1,456,933 | 5/1923 | Rasmussen | 123—119 |
| 1,625,007 | 4/1927 | Weeber | 123—119 |
| 1,726,455 | 8/1929 | Rector | 123—119 |
| 1,901,847 | 3/1933 | Moore | 123—119 |
| 2,012,525 | 8/1935 | Turner | 123—119 |
| 2,096,526 | 10/1937 | Pratt | 123—119 |
| 2,354,179 | 7/1944 | Blanc | 123—119 |
| 3,232,284 | 2/1966 | High | 123—119 |

WENDELL E. BURNS, *Primary Examiner.*

U.S. Cl. X.R.

123—35, 122